United States Patent
Schell et al.

(10) Patent No.: US 6,314,520 B1
(45) Date of Patent: Nov. 6, 2001

(54) TRUSTED WORKSTATION IN A NETWORKED CLIENT/SERVER COMPUTING SYSTEM

(76) Inventors: Roger R. Schell, 1979 N. 630 East, Orem, UT (US) 84097; Douglas Lavell Hale, 627 W. 850 South, Orem, UT (US) 84058; Willard Monten Wiseman, 1360 N. Murdock Dr., Pleasant Grove, UT (US) 84062; James P. Anderson, 140 Morris Rd., Ambler, PA (US) 19002

(*) Notice: Subject to any disclaimer, the term of this patent is extended or adjusted under 35 U.S.C. 154(b) by 0 days.

(21) Appl. No.: 09/252,588

(22) Filed: Feb. 18, 1999

Related U.S. Application Data (62) Division of application No. 08/828,724, filed on Mar. 23, 1997.

(51) Int. Cl.[7] ............................................ G06F 12/14
(52) U.S. Cl. ........................................................ 713/200
(58) Field of Search .................................... 713/200, 201, 713/202; 380/204, 242; 340/825.31, 825.34; 709/229

(56) References Cited

U.S. PATENT DOCUMENTS

| | | | |
|---|---|---|---|
| 5,710,817 | * | 1/1998 | Sjooquist .............................. 380/25 |
| 5,798,706 | * | 8/1998 | Kraemer et al. ................ 340/825.07 |
| 5,805,801 | * | 9/1998 | Holloway et al. .................... 713/201 |
| 5,919,257 | * | 7/1999 | Trostle ................................. 713/200 |
| 6,151,679 | * | 11/2000 | Friedman et al. ................... 713/201 |

* cited by examiner

Primary Examiner—James P. Trammell
Assistant Examiner—Pierre E. Elisca (57) ABSTRACT

A trusted workstation includes a network interface card (NIC) with trusted computing base (TCB) extensions that provide for securely booting the workstation and performing subsequent receive and transmit packet filtering in support of a network's system architecture requirements. The NIC includes a send address confirm circuit which includes a trusted source address (e.g., a MAC address) uniquely associated with the trusted workstation. For each packet to be transmitted from the trusted workstation over the network, the NIC first checks the source address inserted in the packet by the NIC driver running the user session to be sure that the driver inserted source address is equal to the trusted address resident. Thus, if untrusted software on the workstation attempts mischiefly transmit a forged packet with a source address other than the trusted source address, the NIC prohibits transmission of the packet with the forged source address. This prevents the trusted workstation from forging its packets with another client's source address. The NIC also includes a receive address confirmation circuit which ensures that the trusted workstation only receives packets from authorized servers.

14 Claims, 6 Drawing Sheets

TRUSTED WORKSTATION IN A NETWORKED CLIENT/SERVER COMPUTING SYSTEM

CROSS-REFERENCE TO RELATED APPLICATIONS

This is a divisional application of copending application Ser. No. 08/828,724, filed Mar. 23, 1997, entitled "Trusted Workstation In A Networked Client/Server Computing System," which copending application is assigned to the Assignee of the subject application and is incorporated by reference herein in its entirety.

The subject matter of the subject application is also related to that of copending application Ser. No. 08/907,523, filed Aug. 8, 1997, entitled "Networked Workstation Intrusion Detection System," which is assigned to the Assignee of the subject divisional application.

TECHNICAL FIELD

The present invention relates to a computer systems, and in particular to a networked client/server computer system configured to establish a trusted workstation.

BACKGROUND OF THE INVENTION

Client/server computing has become quite a popular architecture in both small and large organizations. As known, these systems include a computer system which operates as a server for a plurality of personal computers and/or workstations, which are generally connected to the server via a network connection comprising a local area network (LAN) or a wide area network (WAN).

Client/server computing networks have dramatically increased and facilitated the access to information. However, due to ubiquitous nature of computer networks the threat to the integrity of the information stored on network resources due to "hackers"P"attackers" and malicious software components (e.g., operating system and application program viruses) has also increased. Threats include any person, place or thing which poses some danger to a network asset.

Security of the information transmitted over the network must be assured hen the network is used to transmit information for businesses such as banking, brokerage, government entities and other users of highly confidential or commercially valuable information. A known threat to the security of information available on a network is a hacker/attacker who poses as an authorized user of the network by impersonating the authorized user. Passwords and other similar operating system level security features often only make it difficult for the hacker/attacker to gain access to the network. However, a patient and capable hacker/attacker can generally bypass most conventional operating system level protections to access the network.

Therefore, there is a need for a technique for ensuring the security of the information stored on a client/server networked computer system and to provide a secure, trusted workstation.

SUMMARY OF THE INVENTION

An object of the present invention is to provide a trusted workstation.

Another object is to restrict communications between a trusted workstation and a known/authorized server.

A further object is to provide a trusted distributed data processing system.

Yet another object is to prevent an unauthorized network user from impersonating an authorized network user.

Briefly, according to the present invention, a trusted workstation includes a network interface card (NIC) with trusted computing base (TCB) extensions that provide for securely booting the workstation and performing subsequent receive and transmit packet filtering operation in support of a network's system architecture requirements. The term "TCB extension" refers to extensions of the server's TCB that operate as part of the workstation's network trusted computing base STCB).

The NIC comprises a send address confirmation circuit which contains a trusted source address (e.g., a medium access control (MAC) address or a network layer address) uniquely associated with the trusted workstation. In general, the source address can be any address that identifies the source of a packet, including for example the MAC address, Internet address, transport layer address or session layer address, etcetera. For each packet transmitted from the trusted workstation over the network, the NIC checks the source address inserted in the packet by an NIC driver to ensure that this driver-inserted source address matches the trusted source address. Thus, if untrusted software on the workstation attempts to transmit a packet with a source address other than the trusted source address, the NIC prevents the packet from being transmitted. This prevents malicious attempts by a hacker/attacker to forge packets from a workstation with another workstation's source address.

The NIC also includes a receive address confirmation circuit that functions to ensure that the trusted workstation does not receive packets from entities other than known/authorized servers. That is, the NIC compares the source address of a packet received over the network to verify that it is from a authorized server. Significantly, if each workstation on a network is populated with a NIC, the known/authorized servers will control all packets on the network and can trust the source of all requests.

The send and receive address confirmation circuits are trusted because the contents of registers resident in these circuits are written to and modifiable only during a pre-boot state, which is the only time the untrusted elements (e.g., untrusted software on the workstation) are not accessed. That is, following a hardware reset and prior to execution of the operating or application software on the workstation, enforcement registers with the send and receive conformation circuits are written to with source address data, and then write disabled to prevent subsequent loading of unauthorized source address data.

Specifically, following a hardware reset of the workstation, the NIC is initialized and pre-boot modules are downloaded to the workstation over the network from a known server under the control of instructions resident in an adapter BIOS on the NIC. The NIC may be located on an expansion board separate (e.g., ISA or PCI compatible) from the workstation motherboard, or on the motherboard. Once the pre-boot modules are down loaded to the workstation, the pre-boot modules are executed to perform a login - identification and authentication (I & A) function for the user and to load the enforcement registers with the send and receive trusted source address information. The enforcement registers are then locked (i.e., write disable) to prevent the contents of the send and receive enforcement registers from being modified until another hardware reset occurs. Once execution of the pre-boot modules is complete, the NIC BIOS transfers code execution to a workstation system BIOS to complete the initialization of the workstation.

The pre-boot modules resident in the NIC BIOS for performing the I & A function include executable code which communicates with the server to verify the identity of the user, log the user into the network once the identity is verified, and establish a connection with the server.

The NIC can enforce as a source address (i.e., compare source addresses) associated with the data link layer address, network layer source addresses or any other address that is used to identify the source of the packet. The data link layer address is the network medium's address and is a hardware based value which is stored in the NIC. For Ethernet networks this address is often referred to as the MAC address. The network layer address is a protocol specific logical address, and therefore is understood to be above the data link layer address in the protocol stack associated with the network. To implement network layer source address enforcement, few intermediate network components (e.g., routers and bridges) need to be involved since the network layer source address is left unchanged by retransmission devices. However, with data. link layer source address enforcement, at least one of the retransmission devices needs to be involved in the source address enforcement since the data link layer source address is modified as it traverses many of these devices, including routers.

An advantage of the present invention is that it provides an inexpensive technique for providing trusted workstations suitable for use in networks with heightened security requirements.

These and other objects, features and advantages of the present invention will become more apparent in light of the following detailed description of preferred embodiments thereof, as illustrated in the accompanying drawings.

DESCRIPTION OF A PREFERRED EMBODIMENT

Figure 1:
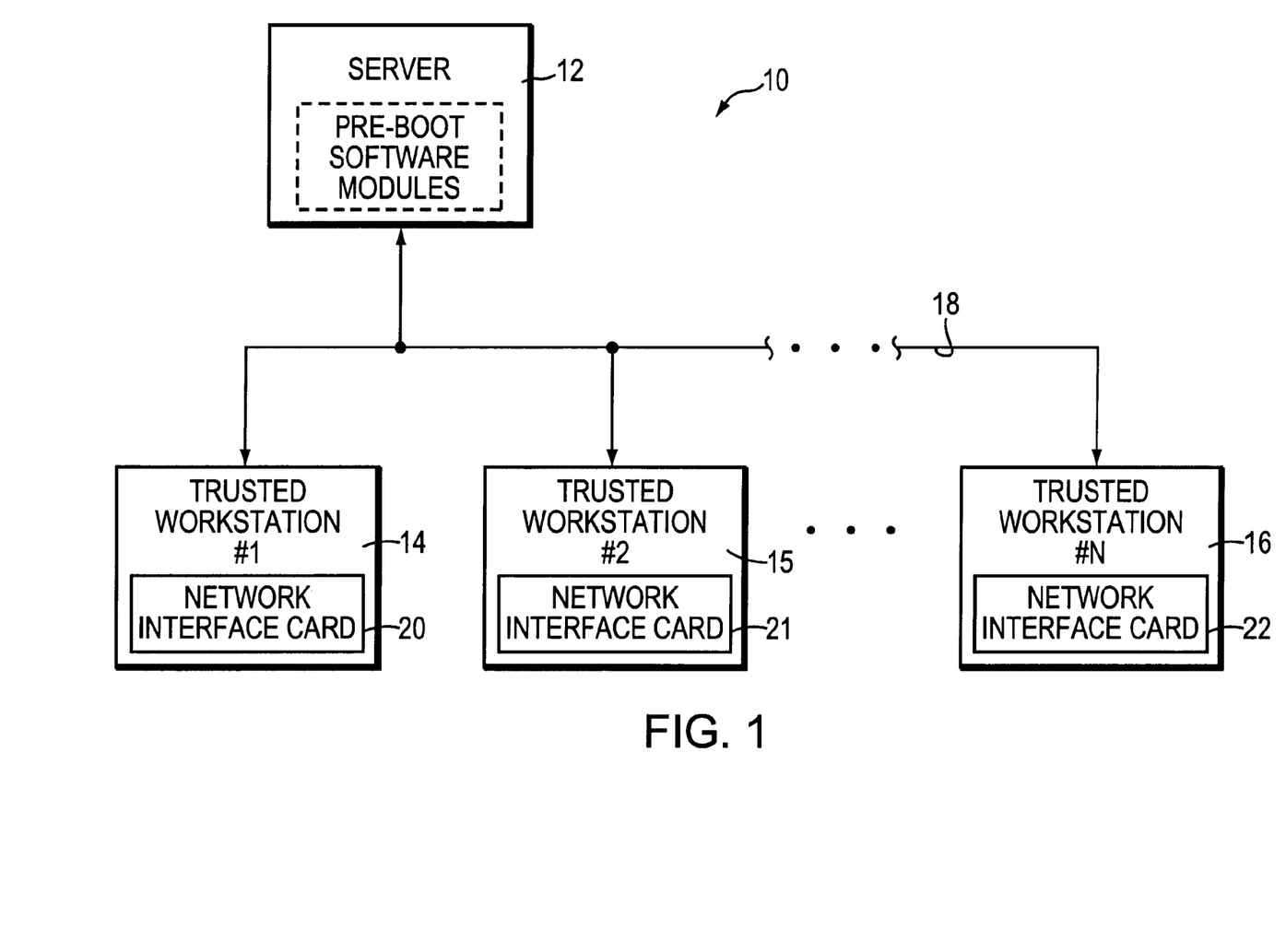
FIG. 1 is a block diagram of a networked computer system which includes a plurality of trusted workstations.

Referring to FIG. 1, a network client server computing system 10 includes a server 12 and a plurality of trusted workstations (e.g., personal computers) 14–16. The server 12 and workstations 14–16 are interconnected via a computer network 18 such as a local area network (LAN) or a wide area network (WAN) and communicate by exchanging discrete packets or frames of data over the computer network 18 according to known network protocols. The computer network 18 may include network intermediate connections such as a router or bridge (not shown) depending upon the span of the network. According to the present invention, each of the trusted workstations 14–16 includes an associated network interface card 20–22, respectively, which establishes a trusted connection between the workstation and the server 12.

Figure 2:
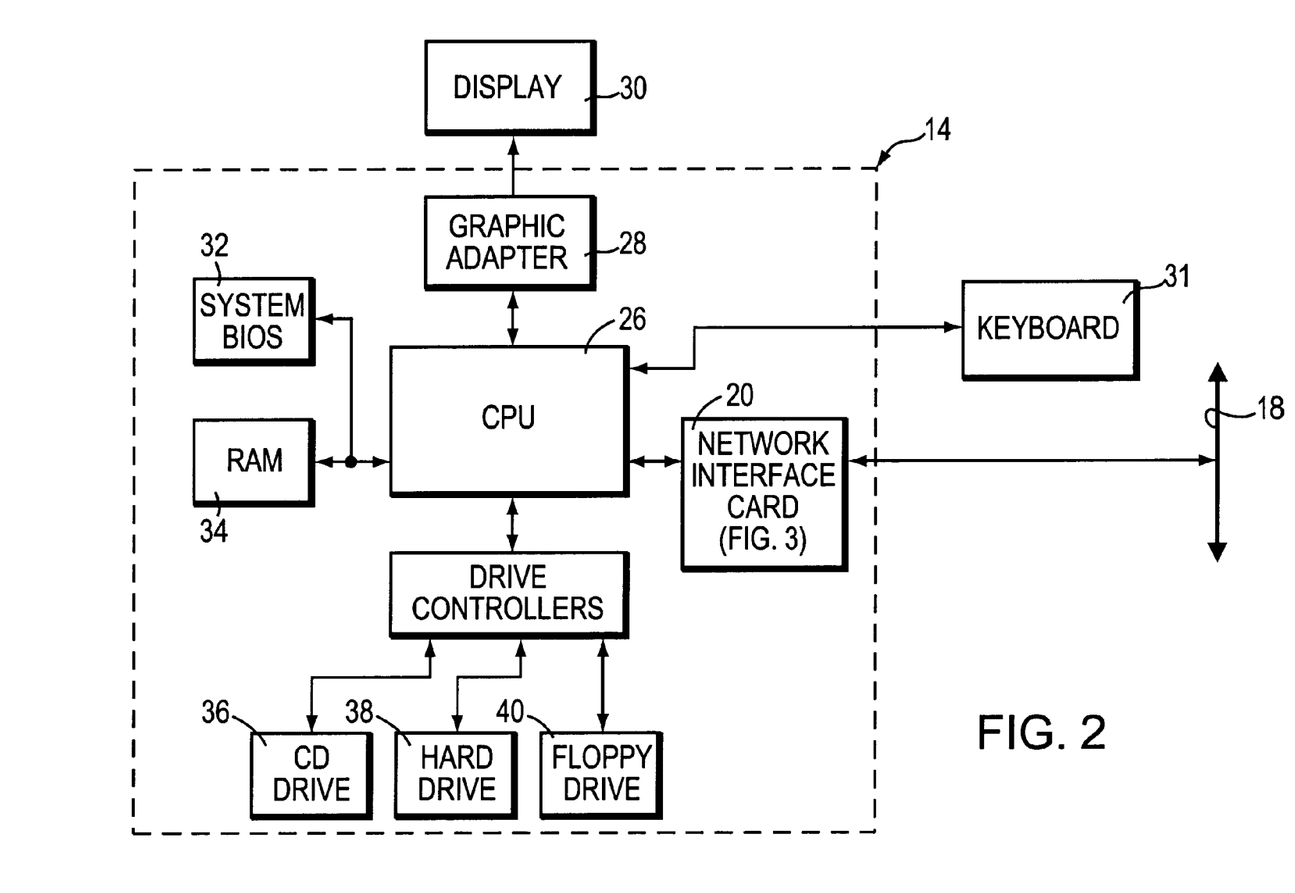
FIG. 2 is a simplified block diagram of a trusted workstation from FIG. 1.

FIG. 2 is a simplified block diagram illustration of the trusted workstation 14. The workstation 14 includes conventional components such as a central processing unit (CPU) 26, a graphics adapter 28, system basic input/output system (BIOS) 32, and computer readable media such as RAM 34, CD drive 36, hard drive 38 and a floppy drive 40. The workstation also includes the network interface card (NIC) 20 through which the workstation communicates with the server 12 (FIG. 1) over the computer network 18. The workstation 14 is connected to a display 30 and a keyboard 31.

Figure 3:
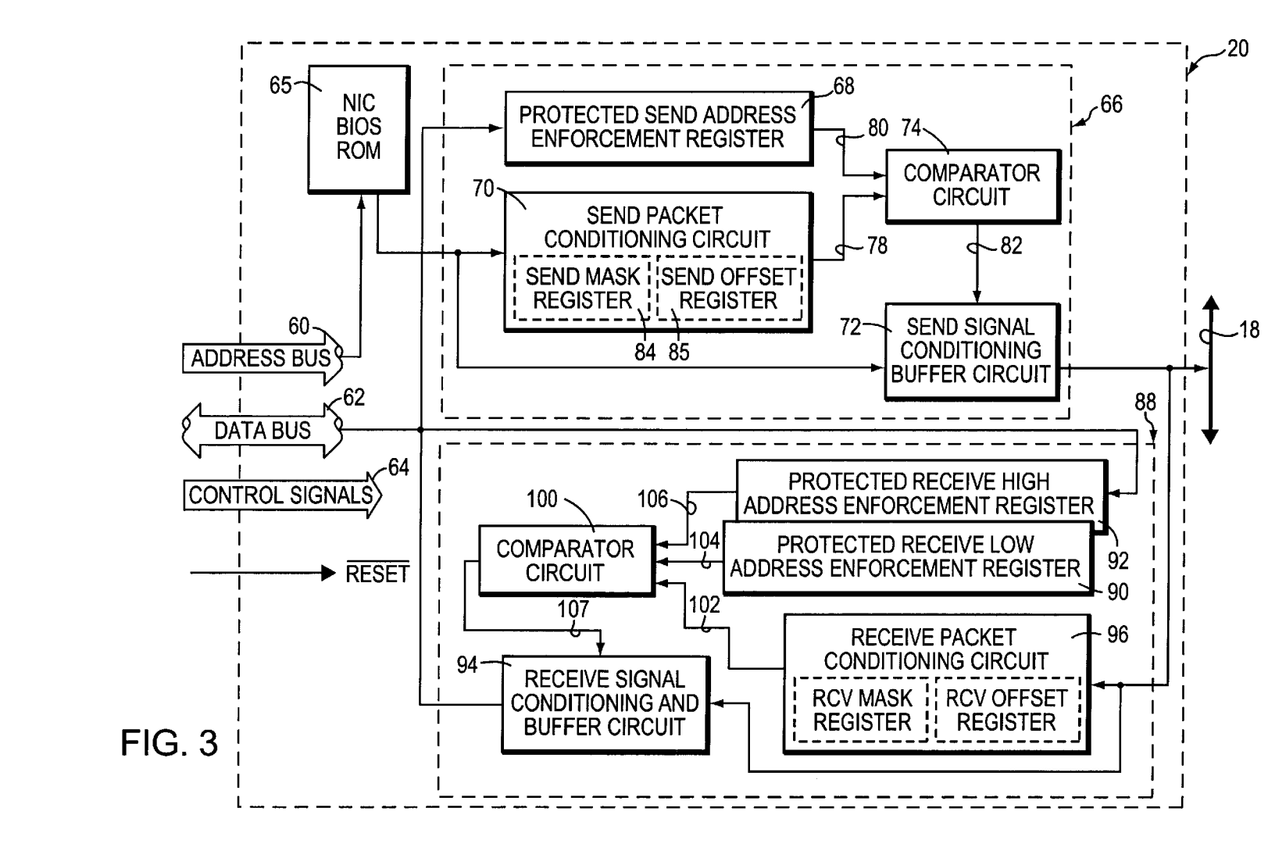
FIG. 3 is a block diagram of a network interface card resident in the trusted workstation illustrated in FIG. 2.

FIG. 3 is a schematic block diagram illustration of the NIC 20. The NIC is preferably an expansion card (e.g., ISA or PCI compatible) which is connected to the CPU 26 (FIG. 2) via an address bus 60, a data bus 62 and a control signal bus 64. The signals from these buses are routed to the various components resident on the NIC in order to perform the functions discussed hereinbelow.

The NIC 20 includes send address confirmation circuitry 66 which includes a protected send address enforcement register 68, a packet conditioning circuit 70, send signal conditioning buffer circuitry 72, and a comparator circuit 74. During initialization the protected send address enforcement register 68 is loaded with a trusted source address value indicative of a link layer address (e.g., a MAC address or network layer address.) uniquely associated with the workstation 14. The initialization steps shall be discussed hereinafter in detail. To ensure that the packet to be transmitted from the workstation has a valid source address (i.e., the source address has not been forged) the packet is input to the packet conditioning circuit 70 and the send signal conditioning buffer circuitry 72. The packet conditioning circuit 70 isolates the source address of the packet and outputs the isolated source address on a line 78 to the comparator 74. The send signal conditioning buffer circuitry 72 includes the necessary circuitry to receive the packet and transmit the packet as a serial signal that is adapted for transmission via the network when enabled. The comparator 74 also receives on a line 80 the trusted source address value stored in the protected send address enforcement register 68, and compares the values of the signals on the lines 78 and 80. If the source address values match, the comparator circuit 74 provides a signal value on a line 82 which enables the send signal conditioning buffer circuit 72 to transmit the packet onto the computer network 18. If the addresses do not match, the NIC prevents the packet from being transmitted onto the network 18 since the packet contains a forged source address.

The send packet conditioning circuit 70 may include a mask register 84 which masks the bits in the packet not associated with the source address and an offset register 85 which shifts the source address bits, thus allowing a boolean comparison to be made with the trusted source address resident in the protected send address enforcement register 68. One of ordinary skill will recognize that there a number of different known ways to effect the packet conditioning and comparison functions in order to isolate the source address of the packet for comparison against the trusted source address stored in the protected send address enforcement register.

The NIC 20 also includes a receive address confirmation circuit 88 which includes a protected receive low address enforcement register 90, a protected receive high address enforcement register 92, a receive signal conditioning and buffer circuit 94, a receive packet conditioning circuit 96 and a receive source address comparator 100. During initialization the protected receive address enforcement registers 90,92 are loaded with a low source address value and a high address value respectively, indicative of a range of valid source addresses associated with known/authorized servers from which the workstation may receive packets. A packet received from the network is input to the receive packet conditioning circuit 96 and the receive signal conditioning and buffer circuit 94. The packet conditioning circuit 96 isolates the source address of the received packet and outputs the isolated source address on a line 102 to the comparator 100. The receive signal conditioning and buffer circuit 94 conditions the serial data stream received from the network and forms a received packet. The comparator 100 also receives the trusted low source address value on a line 104 and the trusted high source address value on a line 106. The comparator 100 then compares the isolated source address on the line 102 with the trusted low and high source address values on lines 104, 106, respectively, to ensure that the isolated source address value is between these two trusted address values. If it is, the comparator provides a control signal on a line 107 which enables the receive packet conditioning and buffer circuit 94 to forward the received packet onto the data bus 62. Otherwise, the received packet is discarded since it was received from a server with which the workstation is not authorized to receive information. The receive packet and conditioning buffer circuit may include a FIFO buffer (not shown) to buffer data for transmission onto the data bus 62.

Figure 4:
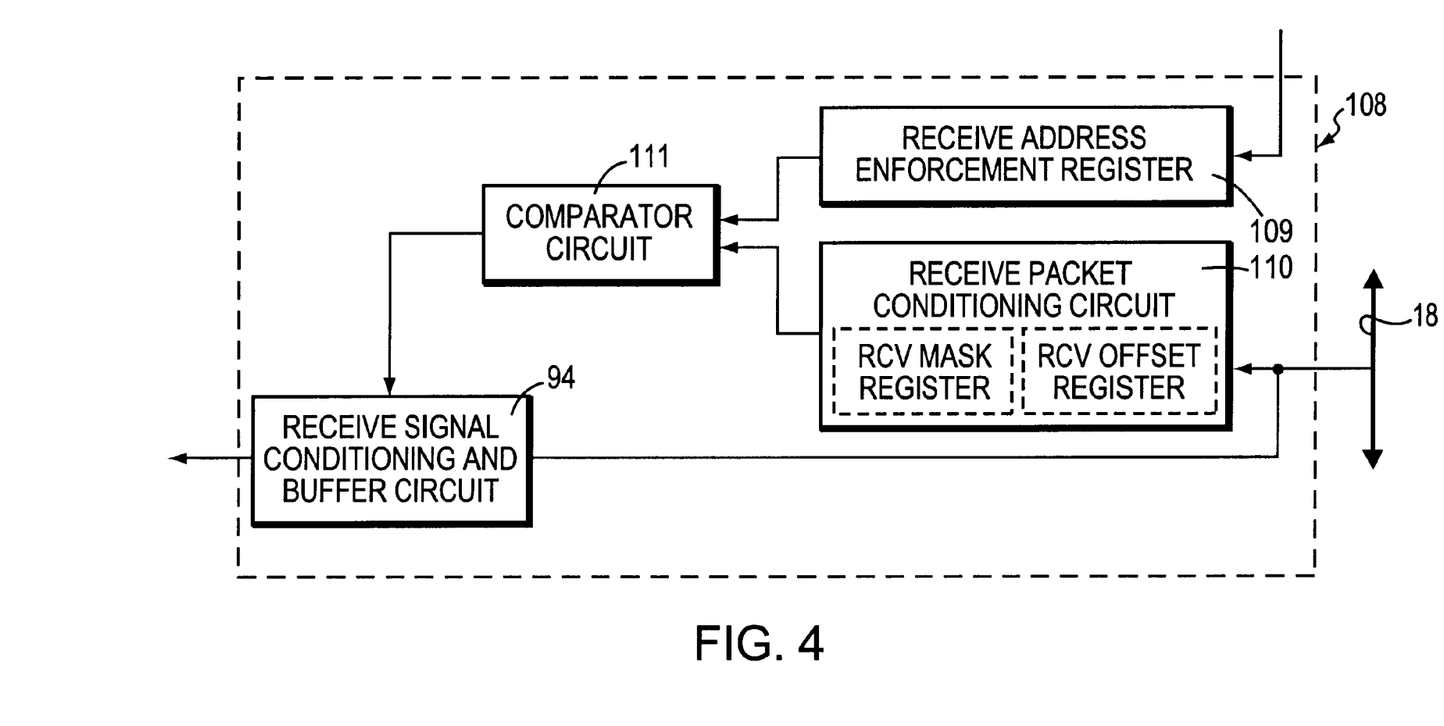
FIG. 4 is a block diagram of an alternative embodiment of the receive address confirmation circuit illustrated in FIG. 3.

FIG. 4 illustrates an alternative embodiment receive address confirmation circuit 108 which takes advantage of the fact that the valid receive source addresses are preferably consecutive within a predefined range. This embodiment is substantially similar to the receive address confirmation circuit 88 (FIG. 3) with the exception of the separate address enforcement registers. Specifically, the receive address confirmation circuit 108 includes a single receive address enforcement register 109 which contains the significant bits for the range of valid receive source addresses. For example, if the range of valid source addresses is 8FFF000-8FFFFFF (hex), the receive address enforcement register 109 is loaded with the sixteen most significant bits (8FFF) since all the least significant bits are within the range of valid source addresses. Receive packet conditioning circuit 110 conditions the received packet to isolate the most significant bits representative of the range of valid source addresses and feeds the isolated/truncated source address bits into comparator 111.

Referring to FIG. 3, the NIC includes a BIOS ROM 65 that contains program instructions which are executed in the CPU 26 (FIG. 2) during initialization in order to, inter alia, initiate downloading of executable pre-boot software modules resident on the server 12 (FIG. 1). The NIC BIOS ROM 65 also includes program instructions for locking (i.e., write disabling) the protected address enforcement registers 68, 90, 92 and the mask registers on the NIC. The program instructions for locking the protected address enforcement registers ensure that in the event the pre-boot modules cannot be downloaded (e.g., if there is no physical connection between the network and the workstation), the enforcement registers may still be locked to prevent untrusted software from writing to these registers.

The initialization sequence of the NIC and workstation shall now be discussed.

Figure 5:
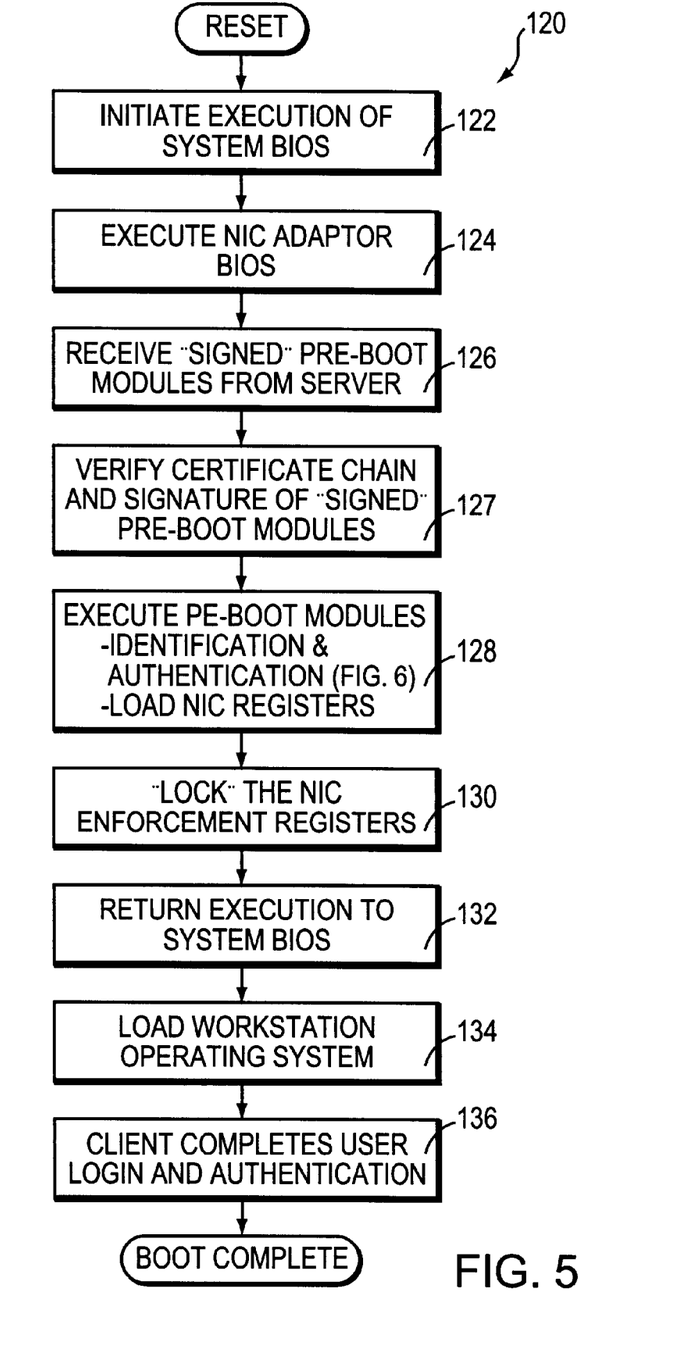
FIG. 5 is a flowchart illustration of the steps performed during system initialization.

FIG. 5 is a flowchart illustration of a series of initialization steps 120 performed by the trusted workstation 14 (FIG. 1) following a hardware reset. The series of steps includes step 122 which initiates execution of the program instructions resident in the system BIOS 32 (FIG. 2). The program instructions executed in step 122 initialize and take an inventory of the hardware resident on the main system board (i.e., the motherboard) of the workstation and the installed adapters. During this step the system BIOS calls each installed adapter board in the order of its address. The NIC BIOS generally does not have to be the first adapter BIOS called. However, in order to ensure proper system security, the NIC BIOS is preferably called prior to execution of any adapter BIOS that is software modifiable.

Initialization continues with step 124 wherein the CPU executes the program instructions resident in the NIC BIOS 65 (FIG. 3) to initialize the hardware in the NIC. Following hardware initialization, the CPU downloads the pre-boot modules from the server in step 126 and in step 128, executes these pre-boot modules to perform the identification and authorization function associated with the login process described in FIG. 6. In addition the CPU loads the registers of the NIC's send address confirmation circuitry 66 and the receive address confirmation circuit 88 (FIG. 3) with values stored in the NIC BIOS ROM. In an alternative embodiment, the pre-boot modules may be stored in the NIC BIOS.

To further enhance the trusted path between the workstation and the server, the pre-boot modules may be "signed". Each pre-boot module includes a different signature which the workstation uses in step 127 to verify that the module is authentic and this prevents unauthorized replaceable or modification of the downloaded pre-boot modules. In general, signing of information transmitted over a network is known, see for example the text "Network Security: Private Communication in a Public World", by C. Kaufman, R. Perlman and M. Speciner, published by Prentice Hall PTR, 1995 which is hereby incorporated by reference. To verify the certificate chain and the signature of the "signed" pre-boot modules, a root master public key (i.e., the public key associated with the highest certificate authority) is stored in the NIC BIOS ROM along with the executable code required to perform the verification of step 127.

Figure 6:
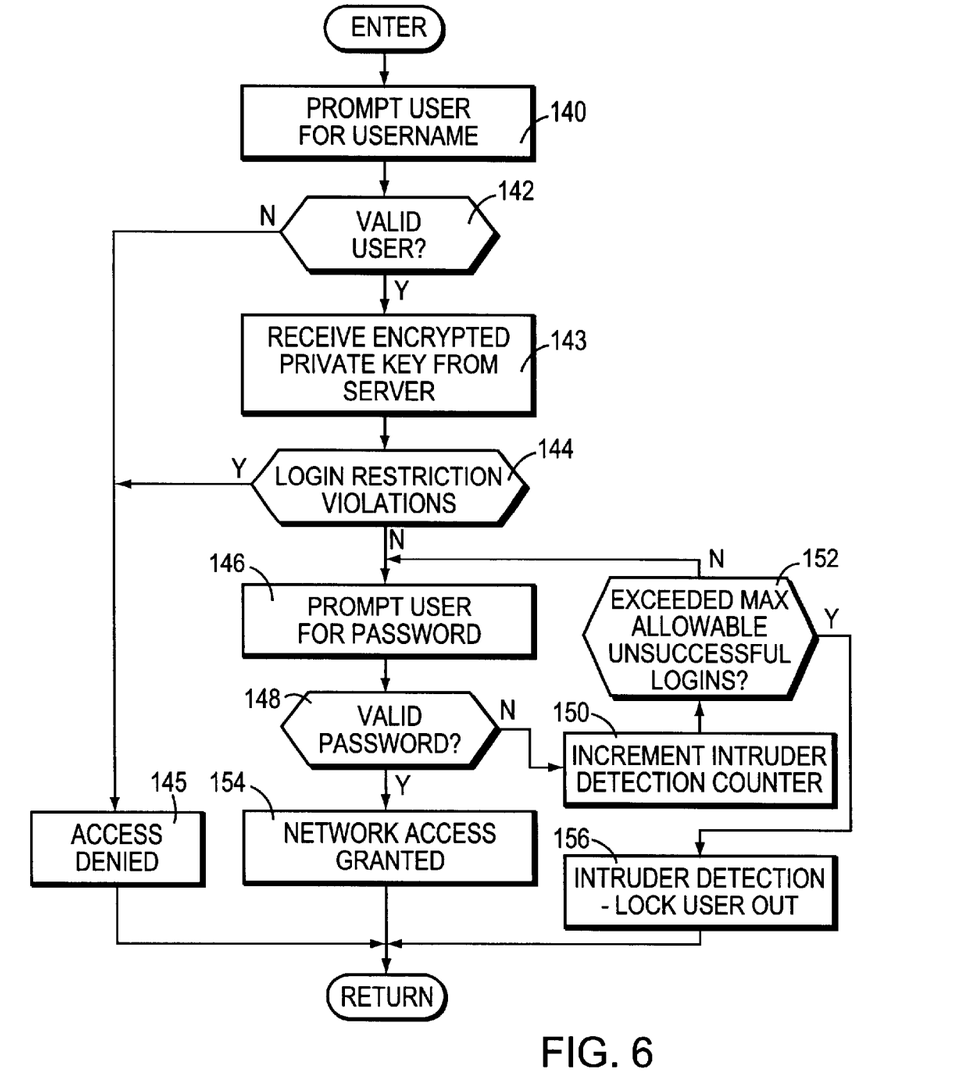
FIG. 6 is a flowchart illustration of the steps associated with the login process.

FIG. 6 is a flow chart illustration of the login process. In step 140 a username prompt is presented to the user. In response, the user enters a username which is transmitted to the server and in step 142 the server compares the entered username against a list of authorized users. If the username is not valid, network access is denied in step 145 and the login process ends. However, if the entered username is on the list, the server returns an encrypted private key to the workstation in step 143. The encrypted private key can only be decrypted with the user s password. In step 144 the server checks if any login restrictions, such as, time restrictions, station restrictions and account lock-out restrictions have been violated. These restrictions prevent logins from unauthorized workstations or logins during the wrong time of day. If there are violations access is denied (step 145). However, if there are no login restrictions, the user is prompted to enter a password in step 146 and the validity of the password is determined in step 148.

Specifically, step 148 comprises a plurality of operations between the workstation and the server to verify the validity of the password while maintaining the integrity of the password transmitted over the network 18. Upon entry of the password, the workstation decrypts the encrypted private key with the password entered by the user. The workstation then erases the password from workstation memory to prevent a hacker from obtaining the password. The workstation then maintains an authenticator credential uniquely indicative of the user. The credential includes information identifying the user's complete name, the workstation source address and a validity period (i.e., the duration of time the authenticator is valid). The workstation then creates a signature using the authenticator credential and the decrypted private key. The signature is used for background authentication and to further assist in validating the authenticity of packets transmitted by the workstation onto the network. In order to complete the authentication process, the workstation creates a -proof using the signature, the request for authentication and a random number. The proof is then encrypted by the workstation with the user's private key and transmitted to the server which determines if the proof is valid (this verifies that the password entered by the user was the correct password). If it is, the server transmits a message to the workstation that the user properly logged onto the network and the workstation user is granted conditional access to the network (e.g., to NDS). Note, that with network centric operating system such as Novell's NetWare® 4.1, the user logs into the network rather than into individual servers resident on the network.

If the server determines that the proof is invalid, the server increments an intruder detection counter in step 150. In step 152 the server compares the value of the counter with a predetermined maximum value to prevent logins by the user (step 156) if there have been a number of unsuccessful attempts to enter the correct password. If a valid proof is transmitted to the server, network access is granted in step 154 (note the proof will only be valid if the user entered the correct password). In step 156, the NIC may be disabled to prevent subsequent workstation/server communication, while still allowing the workstation to operate as a public object (i.e., as a stand alone workstation). Alternatively, the workstation may be completely disabled, for example, by not loading the operating system from the server.

The operations associated with authentication are preferably based upon the known Rivest Shamir and Adleman (RSA™) encryption technique and an independent private key algorithm. One key is public (all users of the network have access to it) while the other is kept private (only a designated user knows about it).

Referring again to FIG. 5, in step 128 the pre-boot modules executed by the workstation also perform the step of loading the NIC registers. This step includes loading the protected send enforcement register 68 (FIG. 3) with a trusted source address value uniquely associated with the workstation 14. The protected receive low address enforcement register 90 and protected receive high address enforcement register 92 are also loaded with a low address value and a high address value respectively, indicative of the range of source addresses associated with servers (e.g., NetWare® servers) from which the workstation may receive packets. Preferably, each server (e.g., all NetWare® servers) has a source address within a specified address range, thus allowing the NIC to perform a source address range check to determine if the information is from a server rather than another workstation on the network.

Upon the completion of the pre-boot module execution, the workstation CPU locks (i.e., write disables) the NIC enforcement registers in step 130. This ensures that the untrusted operating system and application software (executed after initialization) cannot mischiefly alter the contents of the NIC enforcement registers. The NIC enforcement registers can only be unlocked by a hardware reset.

In step 132 CPU execution returns to execute program instructions resident in the system BIOS 32 (FIG. 2), and in step 134 the workstation operating system software is downloaded from the server to the workstation. The user login and authentication process is then completed in step 136.

As noted, the NIC can enforce as a source address any address that identifies the source of a packet including the datalink layer or network layer source addresses. With network layer source address enforcement few intermediate components are involved since the network layer source address is left unchanged by retransmission devices such as routers and bridges. However, with datalink layer source address enforcement, at least one of the retransmission devices is needed because the data link layer source address is modified as it traverses many of these devices, including routers. The known servers and/or source address enforcing routers must enforce the association between the data link layer and network layer source addresses when processing packets which are either to be routed or are destined for the known server.

An API is preferably used to load the enforcement registers transparent to the implementation hardware.

Advantageously, the trusted NIC allows what would otherwise be untrusted workstations to participate in an enhanced security network (e.g., a class C2 evaluated network). The trusted NIC provides an inexpensive, hardware based network TCB within an otherwise untrusted workstation thus reducing the cost of a class C2 implementation. Even existing workstations can be allowed to participate in a trusted network by installing the NIC. Although the present invention has been shown and described with respect to preferred embodiments thereof, it should be understood by those skilled in the art that various other changes, omissions and additions to the form and detail thereof, may be made therein without departing from the spirit and scope of the invention.

What is claimed is:

1. A network interface card for use in a workstation of a networked computing system which includes a server, the network interface card comprising:

address confirmation circuitry which receives a packet containing a source address value, and compares said source address value against a trusted source address value stored in said address confirmation circuitry including send address confirmation circuitry which receives a transmission packet including a send source address value to be transmitted from the workstation, and compares said send source address value with a trusted send source address value stored in a send address enforcement register; and means for preventing the transmission od said packet if said source address value does not match said trusted source address value, and including a send signal conditioning buffer circuit coupled to said send address confirmation circuit, said conditioning buffer circuit receives said transmission packet and transmits said transmission packet onto the network if said send source address value matches said trusted send source address value.

2. The network interface card of claim 1, wherein said send address enforcement register includes means for preventing data from being written to said send address enforcement register subsequent to initialization.

3. The network interface card of claim 1, wherein said address confirmation circuitry comprises a receive address confirmation circuit responsive to a received data packet received over the network and having a received source address field, said receive address confirmation circuit including means for comparing said received data packet to determine if said received source address field value is associated with the server; and wherein said means for preventing comprises a receive signal conditioning buffer circuit coupled to said receive address confirmation circuit, said receive signal conditioning buffer circuit receives said received data packet and discards said received data packet if said received source address value is not associated with the server.

4. The network interface card of claim 3., wherein said receive signal conditioning buffer circuit comprises a comparator which compares whether said received source address value is between a first source address value and a second source address value.

5. The network interface card of claim 3, wherein
said receive signal conditioning buffer circuit comprises a receive address enforcement register which contains a trusted receive source address value; and wherein
said means for comparing comprises a comparator which receives and compares said trusted receive source address value against said received source address value.

6. The network interface card of claim 1, further comprising a BIOS ROM comprising program instructions executable in the workstation during initialization to initialize the network interface card following a hardware reset, and to initiate and control downloading of pre-boot modules of executable program instructions from the server to the workstation during initialization, and including program instructions to initiate execution of said pre-boot modules in said workstation, wherein said pre-boot modules include program instructions for identifying and authenticating a workstation user.

7. The network interface card of claim 6 wherein said program instructions for identifying and authenticating a workstation user comprises program instructions for disabling the network interface card to prevent the workstation from communicating with the server if the user is unsuccessfully authenticated.

8. The network interface card of claim 6 wherein said program instructions for identifying and authenticating a workstation user comprises program instructions which prevent the workstation from booting up if the user is unsuccessfully authenticated.

9. The network interface card of claim 6, wherein said downloaded pre-boot modules are signed using public key encryption.

10. A workstation capable of operating as a networked workstation, and receiving and transmitting data packets over a network medium, said workstation comprising:
a central processing unit;
input/output devices including a keyboard and a display operatively connected to said central processing unit, and memory including a hard drive and RAM operatively connected to said central processing unit;
a network interface card installed in said workstation to receive information from said central processing unit and information over the network medium, said network interface card comprising
address confirmation circuitry send which receives a transmission packet to be transmitted from the workstation onto the network medium, and compares a send source address value of said transmission packet with a trusted send source address value stored in a send address enforcement register; and
means for preventing the transmission of said packet if said source address value does not match said trusted source address value including a send signal conditioning buffer circuit coupled to said send address confirmation circuit, which receives said transmission packet and transmits said transmission packet onto the network if said send source address value matches said trusted send source address value.

11. The workstation of claim 10, wherein said address confirmation circuitry further comprises
a receive address confirmation circuit responsive to a received data packet received over the network medium and having a received source address field, said receive address confirmation circuit including means for comparing said received data packet to determine if said received source address field value is associated with an authorized source; and
wherein said means for preventing comprises a receive signal conditioning buffer circuit coupled to said receive address confirmation circuit, which receives said received data packet and discards said received data packet if said received source address value is not from an authorized source.

12. The workstation of claim 11, wherein said means for comparing comprises a comparator which compares a trusted receive source address value against said received source address value in order to determine if said received source address value is associated with an authorized source; and
wherein said means for preventing comprises a receive signal conditioning buffer circuit coupled to said means for comparing, wherein said signal conditioning buffer circuit receives said received data packet and discards said received data packet if said comparator determines that said received source address value is associated with an unauthorized source.

13. The workstation of claims 12, wherein said network interface card further comprises
a BIOS ROM comprising program instructions executable in the workstation during initialization, to initialize the network interface card following a hardware reset, and to initiate and control downloading of pre-boot modules of executable program instructions over the network medium from a server to the workstation during initialization.

14. A networked client/server computing system, comprising:
a network medium;
a server interconnected to said network medium;
a workstation comprising
A) a central processing unit;
B) input/output devices including a keyboard and a display operatively connected to said central processing unit, and memory including a hard drive and RAM operatively connected to said central processing unit;
C) a network interface card installed in said workstation to receive information from said central processing unit and information over said network medium, said network interface card comprising
C1) address confirmation circuitry which receives a transmission packet to be transmitted from said workstation onto said network medium, and compares a send source address value of said transmission packet with a trusted send source address value stored in a send address enforcement register, and further including a receive address confirmation circuit responsive to a received data packet received over said network medium and having a received source address field, said receive address confirmation circuit including means for comparing said received data packet to determine if said received source address field value is associated with an authorized source; and C2) means for preventing the transmission of said packet if said source address value does not match said trusted source address value including a send signal conditioning buffer circuit coupled to said send address confirmation circuit, which receives said transmission packet and transmits said transmission packet onto the network if said send source address value matches said trusted send source address value and a receive signal conditioning buffer circuit coupled to said receive address confirmation circuit, which receives said received data packet and discards said received data packet if said received source address value is not from an authorized source.

* * * * *